Feb. 2, 1960 — M. POBOG ET AL — 2,923,354
TAPE PERFORATOR
Filed Sept. 30, 1958 — 2 Sheets-Sheet 2

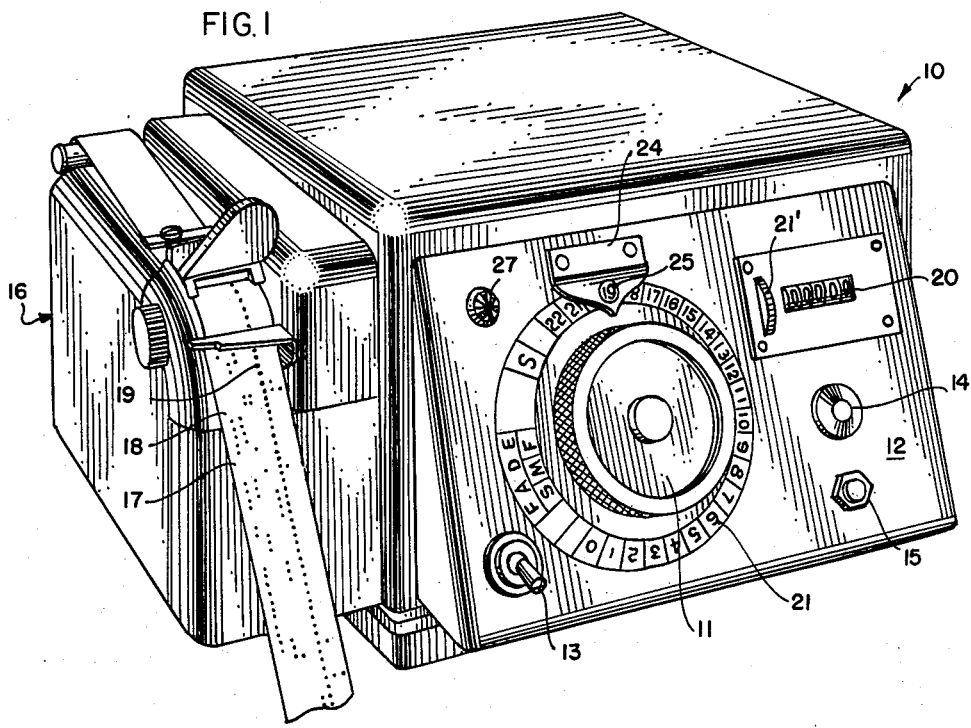
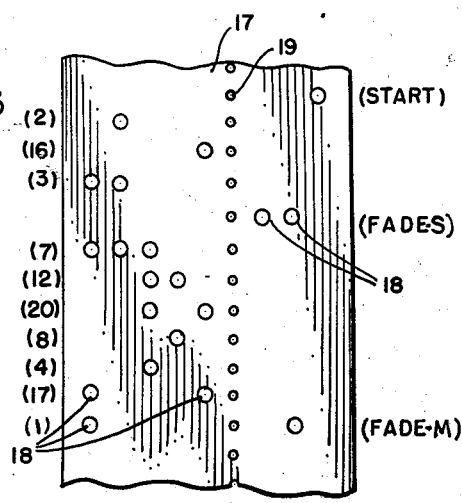

INVENTORS:
THEODORE W. BATTERMAN
MATHEW POBOG
BY Silverman, Mullin & Cass
ATT'YS

United States Patent Office 2,923,354
Patented Feb. 2, 1960

2,923,354
TAPE PERFORATOR

Mathew Pobog, Danville, and Theodore W. Batterman, Park Ridge, Ill., assignors to Electric Eye Equipment Company, Danville, Ill., a corporation of Delaware Application September 30, 1958, Serial No. 764,330

16 Claims. (Cl. 164—111)

This invention relates generally to tape perforators and more particularly is concerned with an automatic tape perforating device intended to perforate programming tapes.

In many fields, industrial and commercial, control of a process or program is obtained by means of signals which are obtained through the use of a perforated tape. The tape is provided with suitable perforations representing various conditions of the operating medium, is fed through a reader device which interprets the perforations, converting them into the proper signals and applies them to means channeling the information to the operating means.

The invention herein is suitable for use in many different fields, but will specifically be described in connection with the art of printing motion pictures.

The master motion picture film which is produced by photographing of scenes is required to be printed, that is, reproduced at least one or more times in obtaining copies for display or sale. In addition, the master itself is usually not suitable for use because the lighting conditions under which the film has been made are rarely optimum. It is only by printing the master upon sensitive film with control of lighting conditions that a satisfactory reel of film can be produced for commercial or similar use.

It has therefore become customary in the industry to produce the film in the following manner: After the scenes photographed have been edited by cutting and splicing and the like the editor views the resulting master film for determining the best lighting conditions for printing the same. These are tabulated in any manner and the master film is suitably identified at each scene with a cue to coincide with the lighting conditions marked on the tabulation for that scene. The standard intensity of lighting used in the motion picture printing industry is represented by any one of the twenty-two consecutive numbers 1 to 22, and zero for complete absence of light. The light increases with increase in the number representing intensity in accordance with standards adopted by the industry. Thus the printing editor will produce a cue or mark on the master at each scene, by means of a notch, perforation or by affixing a small foil member at the edge (to close a suitable electrical circuit, for example), and will assign to that scene a number representing, in his best judgment, the proper lighting conditions for optimum printing. The film identification or cues will be numbered consecutively on the tabulation, obviously, and each scene will have a number which corresponds to the desired light intensity. Thus, scene 1 may have a light intensity of 15, scene 2 will have a light intensity of 12, and so on.

As the master film runs through the printing mechanism or printer, as it is known, the operator receives a signal each time that a scene begins or ends, and can make the necessary changes in the printing machine to provide the light called for by the tabulation which the editor has furnished to him. The signal which is given to the operator is activated by the notch or perforation or foil member on the master film. The operator changes the light conditions in the most widely known of the film printers by varying the position of a shutter that intercepts more or less of the light that is directed upon the moving film. The printers are in most cases contact printers, and the two engaged strips of film—the master and the sensitized film—pass an iris against which a beam of light is continuously directed.

In addition to the twenty-two values of light intensity, film printers are also required to be equipped to cause fading of the scene at three different speeds.

The operator heretofore has been required to make any and all the changes in the shutter through adjustment of manual levers and the like provided on the printers. The difficulties and disadvantages of this arrangement will be obvious to those skilled in this art, and errors and film spoilage are quite common. The operators are required to be skilled and the speed at which they can operate is of course limited.

There are other factors which are becoming more and more important in this field. In addition to the long length feature films requiring an hour or more to display, and in which the importance of short scenes may have been submerged in the overall story told, television, industry and the educational fields have increased the demands for short subject films. In such films the scenes are of extremely short duration, since the importance of flashes appearing in a given subject may be quite great. Manual control of the shutter to change lighting conditions taxes the operator's skill and stamina at speeds in excess of 60 feet per minute. Furthermore, although operating at this slow speed an operator can make changes for scenes of a length of one foot or more, this becomes practically an impossibility if there are a large number of successive short scenes.

Modern film subjects are not unusual where there are a large number of successive short scenes, and where the scenes may be as little as one half foot in length.

To the alleviation of these difficulties, applicants herein have devised a high speed fully automatic system for printing film, in which the shutter is pre-set and operated automatically and programming means are provided to automatically feed pre-set information to the system operating the shutter. Such a system can accomplish printing at rates of up to 150 feet per minute without error, spoilage and the like.

The system which is referred to is shown and described in our co-pending application, Serial No. 764,331, filed September 30, 1958 and one programming means other a tape-actuated device is shown and described in our co-pending application Serial No. 768,687, filed October 21, 1958. Both of said applications and that herein are assigned to the same assignee.

In the use of the system which effects the printing of film automatically, it is feasible and desirable to automatically apply the signals to the printer which are obtained from a preperforated tape passed through a reader which scans the tape and provides the signals that are fed into the printer, said signals cooperating with the scene cues provided on the master film itself. There are tape readers which may be purchased which will provide the desired signals, and the pre-punched tape is fed into these readers, the output being the desired actuating signals.

Heretofore, the tape which is used with the readers has been manually punched in accordance with a standardized binary code in which the desired information is translated manually into a transverse line of punches in a paper tape, say one inch in width. The width of the usable portion of the paper tape is sufficient to accommodate eight or nine holes or perforations aligned transversely of the tape, and the mechanism which is known enables these perforations to be punched manually by the film editor. Each group of punches, provides a combination of holes which the reader identifies as one of the conditions of lighting or a condition of fade, or a start or stop signal which is used to energize or de-energize the printer.

The editor in preparing the paper tape has been required in the past to operate a key-board, not much different from those used to operate adding machines or typewriters, and the keys or buttons of the keyboard operate the punch solenoids to apply the different bits of information in the form of holes or perforations.

The invention herein is primarily intended for the purpose of eliminating the keyboard, and providing an automatic punch which is combined with a suitable dial so that the editor merely turns the dial to the desired lighting condition, or fade, or start-stop, presses a button, and applies the entire group of perforations across the tape at one time, automatically advancing the tape to the next position. The invention has as additional objects the provision of a simple, economical, easily operated tape perforator which will save time, eliminate mistakes, and which can be operated without the need of any skill on the part of the editor—as required when a keyboard is being operated.

As will be developed hereinafter, the punching mechanisms are actuated by means of solenoids which are required to be energized in order to effect the operation thereof. The invention provides means whereby the right combination of punches can be operated merely by pressing a single button, after the proper circuitry has been set up by means of the control knob. In a structure of this kind, the application of current to the solenoids through the pressing of a button or the closing of a switch may readily continue to apply current and hence cause the punches to operate several times. Since the tape moves when the perforations have been made, this may result in the same perforations being made in the second position of the tape, thereby rendering the tape unusable. This is highly important because it will be appreciated that the tape is being perforated simultaneously that the editor is viewing the film and a short length of tape may represent thousands of feet of film.

The invention provides a positive means for preventing the punch solenoids from being actuated more than once when the punch switch is closed to prevent multiple perforation. This object also includes the provision of a novel but quite simple circuit for accomplishing this in a highly economical manner.

The many other objects and advantages of the invention which are not set forth hereinabove because of lack of space will become obvious and known to those skilled in this art as the description of the invention proceeds in which a preferred embodiment of the invention has been set forth for illustrative purposes. The details of the preferred embodiment are not intended to limit or confine the invention, but merely to assist in an understanding and appreciation of the features thereof.

In the drawings:

Fig. 1 is a perspective view of a tape perforator constructed in accordance with the invention, and having the invention incorporated therein.

Fig. 3 is a fragmentary plan view of a portion of a tape punched in accordance with the invention.

Figure 2:
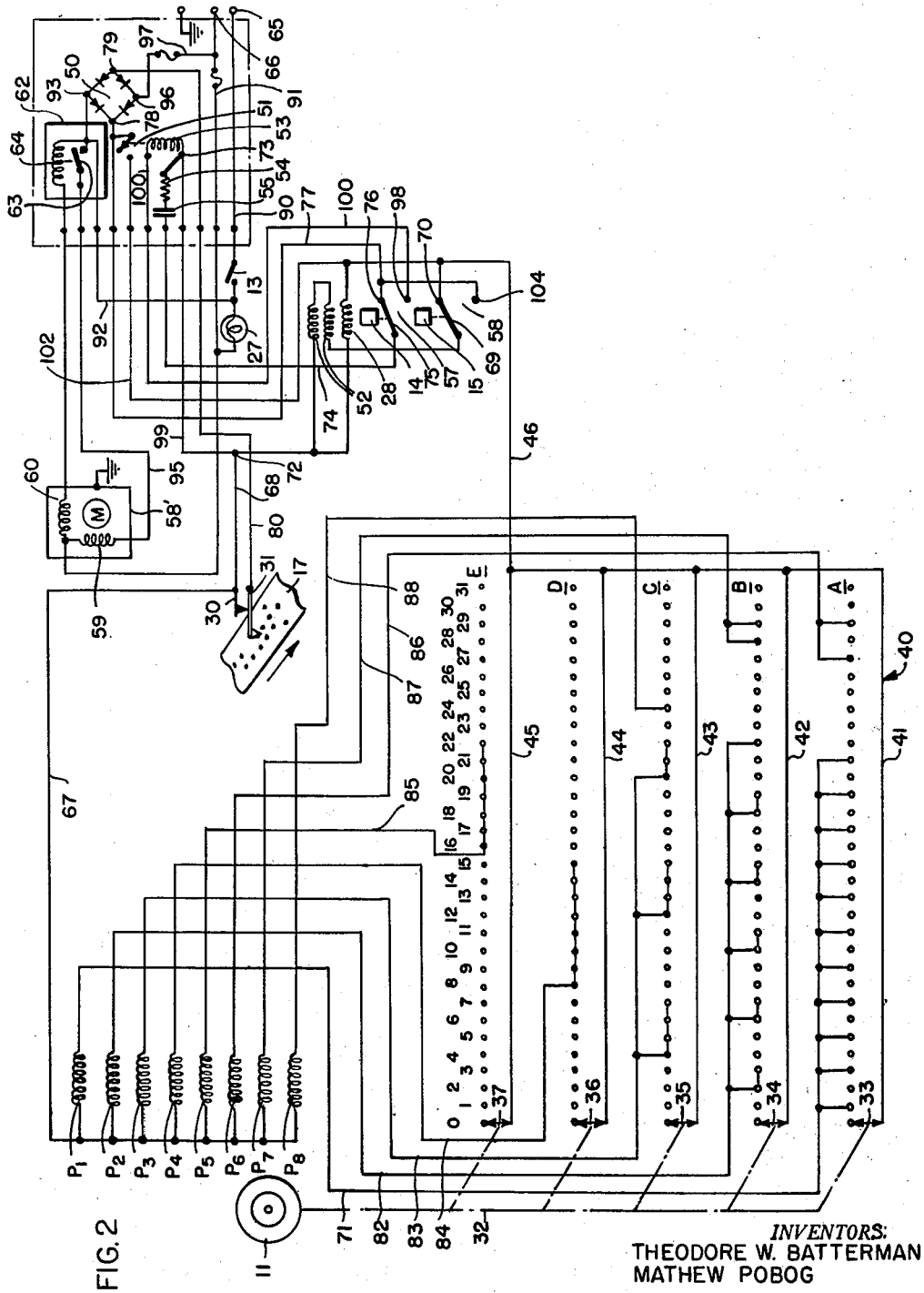
Fig. 2 is a schematic electrical circuit diagram of the invention to show the manner in which the same is incorporated into and combined with known structure to provide the vastly improved tape perforator.

Referring now to Fig. 1, the invention herein takes the place of a key-board and its associated circuitry, enabling the functions previously performed through the use of a keyboard to be performed by the use of a simple dial together with a minimum of buttons or switches. In said Fig. 1 there is illustrated a tape perforator 10, the simplicity of the invention being emphasized by noting that the only controls which are operated by the film editor in perforating the tape comprise the large dial 11 on the front panel 12, which is manually rotated to any of a number of different positions: the off-on switch 13 which merely energizes the entire device; the push button 14 which punches the desired combination of holes and causes the tape to advance one space; and the push-button 15 which advances the tape without punching the same.

The mechanism designated generally 16 on the left hand side of the device 10 is well-known and commercially available, but heretofore has only operated in conjunction with manual key-boards. The tape 17 (Fig. 3) passes through the punch mechanism 16 resulting in the tape having the coded binary bits applied thereto in the form of the holes 18. The single row of small perforations 19 enables the tape to be driven through the perforating mechanism on a suitable sprocket wheel which is not shown.

The counter 20 displays a number which represents the number of scenes that have been edited and have the necessary binary information already applied to the tape 17. Suitable means are provided at 21' to reset the counter.

The dial 11 has a display edge 21 provided with the characters 0 to 22 engraved or otherwise applied thereon, these numbers being in consecutive unit spaces circumferentially arranged about the dial and cooperating with a pointer 24 secured to the panel 12, having a window 25 beneath which the character representing the position of the dial 11 appears. Several other characters are provided on the edge 21 of the dial including the letter "S" for start and stop, and three unit spaces designated "FADE" with the letters "S," "M" and "F" in the individual unit spaces of said three. These represent, of course, slow, medium and fast fade.

With 27 unit spaces occupied, and five additional unit spaces used to separate the various parts of the dial, it will be seen that there are 31 positions of the dial. A suitable detent (not shown) may be provided to position dial. Obviously this may be varied depending upon the various functions which the tape perforations represent, and other factors which vary the construction of the device.

The pilot light 27 is used to indicate when the perforator is energized and the motor is running, as will be explained hereinafter.

Attention is now invited to the circuit diagram shown in Fig. 2 in which the elements of the invention are symbolically illustrated, and in connection with which the principal explanation will be made. The only elements which are also illustrated in Fig. 1 are the push buttons 14 and 15, the switch 13, the dial 11 (shown generally at the lower left), the pilot light 27, and the counter whose actuating solenoid is designated 28. The tape 17 when properly passing through the mechanism 16 also forces a pair of contacts 30 and 31 together which are normally separated. These contacts thus serve as an interlock to open the energizing circuit to prevent activation thereof when no tape is in position.

The dial 11 is actually a knob secured to and rotating with a rotary shaft (designated symbolically in Fig. 2 by broken line 32) which is connected with a plurality of movable wipers or sliders 33, 34, 35, 36 and 37. Rotation of the shaft 32 rotates all sliders simultaneously, the sliders being arranged to close the circuits between a plurality of contacts of a large rotary switch 40. The switch 40 has a plurality of banks of contacts, there being five banks in this case, designated A, B, C, D, and E from bottom to top in Fig. 2. Each bank of contacts may be mounted on a separate wafer or level, arranged in a circle about the central shaft 32 so that the sliders 33 to 37 will rotate upon the wafer or level of the respective banks A to E. Each bank has a bus or continuous conductor, designated 41, 42, 43, 44 and 45 respectively from bottom to top, and all being connected to a common conductor 46 for a purpose to be described.

There are thirty-one contacts in each bank, although the number is immaterial to the invention.

The contacts of the top bank E are the only ones numbered in the view, but these numbers will apply to all contacts in the vertical rows for ease in identification hereinafter. Thus, a contact designated C–17 will be the seventeenth contact in the C bank.

As the dial is rotated to any of its positions, all of the sliders will rotate, and circuits will be closed between the contacts which are engaged and the common lead 46 through the respective bus conductors 41 to 45 inclusive.

The circuit which is shown includes a full-wave rectifier 50 which provides the direct current for operating the punch solenoids $P_1$ to $P_8$ inclusive; a clutch switch 51 for energizing the clutch solenoids 52 each time that a series of punches transverse of the tape 17 is made; a solenoid 53 for causing the closing of the switch 51 when energized; a charge and discharge circuit consisting of a resistor 54 and condenser 55 to cause the solenoid 53 to release the switch 51 shortly after causing same to close; the counter solenoid 28; the switch 57 operated by the punch push button 14; the switch 58 operated by the feed push button 15; and the drive motor 58' having the two windings 59 and 60. The motor 58' is an A.C. motor, and a motor starter 62 is provided which includes a switch 63 and solenoid 64.

Power for the operation of the device 10 is obtained from a conventional 115 volt A.C. line 65, 66.

The switch 40 is connected to the various punch relays $P_1$ to $P_8$ to establish circuits energizing the punch relays according to standardized binary combinations for the different positions of the dial 11. None of the zero, 23, 25, 26, 30 or 31 contacts are connected to the circuit, these comprising the condition of no light (zero) and the spaces between the effective portions of the dial edge 21.

The punch solenoid $P_1$ is connected to contacts A–1, A–3, A–5, A–7, A–9, A–11, A–13, A–15, A–17, A–19 and A–21 so that whenever the slider 33 is at any of these positions a circuit is completed from the left side of the punch solenoid $P_1$ through the conductor 67 to the contact 30, conductor 68, solenoids 52 to left side of switch 58 through the switch arm 69 to contact 70, common lead 46, bus conductor 41, lead 71 back to the right hand side of the solenoid $P_1$. This is obviously a short circuit. The junction point 72 extends to the point 73 and thence through the elements 54 and 55 by the lead 74 through the arm 75 of the switch 57 to contact 76, lead 77 to the left hand D.C. terminals 78 of the rectifier 50. The right hand terminal 79 of the rectifier 50 extends by lead 80 to the interlock switch 30—31 and thence to the other side of the capacitor 55.

Under these circumstances the output of the rectifier 50 is across the resistor-capacitor 54—55 which furnishes a load for the same so that as soon as the bridge is energized the condenser 55 will charge to maximum.

The circuits for any of the other punch solenoids $P_2$ to $P_8$ may be similarly traced between the leads 67 and 46.

Solenoid $P_2$ is connected by the lead 82 to the contacts B–2, 3, 6, 7, 10, 11, 14, 15, 18, 19 and 22.

Solenoid $P_3$ is connected by the lead 83 to the contacts C–4, 5, 6, 7, 12, 13, 14, 15, 20, 21 and 22.

Solenoid $P_4$ is connected by the lead 84 to the contacts D–8 to D–15 inclusive.

Solenoid $P_5$ is connected by the lead 85 to the contacts E–16 to E–22 inclusive.

Solenoid $P_6$ is connected by the lead 86 to the contacts A–27 and A–29.

Solenoid $P_7$ is connected by the lead 87 to the contacts B–28 and B–29.

Solenoid $P_8$ is connected by the lead 88 to the contact C–24.

It is desired that for any position of the sliders 33 to 37 inclusive, the circuits to the pertinent punch solenoids will be closed to energize the same and punch suitable holes in the tape 17, with transverse series of holes representing the lighting of the scenes, or the start and stop of the printing machine, or conditions of fade.

The manner in which this is done is quite simple. Each time that the punch button 14 is depressed the tape is punched, the counter actuated for one digit, and the tape advanced to its next position. The motor 58' is continuously energized while the switch 13 is closed, and the solenoid 52 merely causes engagement of a clutch to drive the tape forward.

The closing of switch 13 lights the pilot light 27 which is thereby connected directly across the line 65—66 through the conductors 90 and 91. The conductor 90 extends through switch 13 by way of lead 92 to one terminal of the solenoid 64 and the A.C. terminal 93 of the bridge 50. The circuit through the solenoid 64 also includes the series winding 60 of the motor, back to the line lead 91. The energizing of the solenoid 64 connects the shunt winding 59 of the motor 58' through the switch 63 by lead 95. This motor is thus energized, and A.C. applied across the bridge 50 between the A.C. terminal 93 as explained and the terminal 96 through lead 97.

Under these circumstances, as explained, the condenser 55 is connected across the bridge 50, through the resistor 54 and is charged to a potential which depends upon the D.C. voltage developed across the D.C. terminals of the bridge 50. The purpose of the condenser and its associated circuit is to provide the means referred to above which prevent energization of the punch solenoids $P_1$ to $P_8$ any more than one time when the button 14 is pushed. This provides a substantially fool-proof device, making it impossible to cause multiple punching through inadvertently holding the button 14 down too long.

In effect, when the device is energized, and before the button 14 is depressed, the condenser charges. The circuit including the punch solenoids $P_1$ to $P_8$ at this time is not connected to be energized from the source of D.C. namely the D.C. terminals of the bridge 50. This latter circuit can only get its power through the switch 51, but this switch is normally open. The only manner in which this switch 51 can be closed is if the solenoid 53 is energized. The solenoid 53, in turn, can be energized by discharging the condenser through the same, and this is accomplished by pressing the button 14 and closing the switch 57. This will be described in detail hereinafter.

Assuming that the tape 17 is to be punched, and the proper information has been set into the switch 40 by rotating the dial 11 to a desired position, depressing the punch push button 14 will throw the switch arm 75 to the contact 98. Now the following circuit is established:

Commencing at the terminal 73, through the resistor 54 and capacitor 55, lead 74, switch arm 75 of the switch 57, contact 98, lead 100, solenoid 53, back to the terminal 73. This circuit obviously connects the two plates of the condenser 55 so that the charge which had accumulated while the switch 57 was in its other position, that is, with the arm 75 on the contact 76, can leak off through the solenoid 53. While the condenser 55 is discharging, therefore, a current is flowing through the solenoid 53, and this closes the switch 51 for a time which depends upon the value of the resistor 54, the capacitance of the condenser 55, and the resistance and inductance of the solenoid 53.

The short interval during which the switch 51 is closed establishes the following circuit: commencing at the bridge terminal 78, through switch 51, lead 102, lead 46, switch 40, the connected one or more of the solenoids $P_1$ to $P_8$, lead 67, interlock contacts 30, 31, lead 80, terminal 79. Thus, the punch solenoids which are connected are energized and apply the holes to the tape 17. At the same time, the solenoid 28 is energized through a circuit comprising the lead 102, solenoid 28, terminal 72, lead 68, contacts 30 and 31, lead 80, terminal 79 and this advances the counter 20 one digit. Since the clutch solenoids 52 are in parallel with solenoid 28, so long as the switch 58 has its arm 69 on contact 70, the energization of the solenoid 28 also energizes the solenoid 52 and connects the motor 58' with the tape drive means to move the tape forward one space so that a blank portion becomes available for the next group of transverse holes.

In the event that it is desired merely to advance the tape, the button 15 is pressed moving the switch arm 69 to the contact 104 which establishes the following circuit: terminal 79, lead 80, contacts 30 and 31, lead 68, solenoids 52, switch 58, terminal 104, lead 77, terminal 78. This applies the D.C. from the rectifier 50 to the solenoids 52 and energizes the clutch mechanism to drive the tape forward so long as the button 15 is depressed.

While it is appreciated that certain portions of the apparatus are known, such as the punch solenoids $P_1$ to $P_8$, the clutch and counter solenoids, the motor and starting circuitry, nevertheless the incorporation of the features of the invention into a circuit including old elements results in a structure which accomplishes functions not previously performed. Furthermore, even though such functions are performed automatically by the apparatus of the invention, nevertheless the resulting structure is simple and enables the perforator to be manufactured economically. The novel portions of the apparatus are believed to comprise at least the coding device or conversion apparatus in the form of the switch 49 which renders the apparatus practically automatic to apply the proper perforations to the tape 17 which represent the desired function that is to be performed by the machine that the tape controls; and the charge and discharge circuit with its solenoid and associated circuitry so that it is only possible to energize the punch solenoids $P_1$ to $P_8$ once when the button 14 is depressed. These portions of the apparatus, combined with other elements form the invention as claimed hereinafter.

In order to appreciate the function of the apparatus, in Fig. 3, there is illustrated a portion of a tape which has been punched to provide the machine controlled by the tape with signals representative of the following tabulated functions it is desired to be performed:

| No. of signal | Function to be performed |
| --- | --- |
| 1 | Start printer. |
| 2 | Light 2. |
| 3 | Light 16. |
| 4 | Light 3. |
| 5 | Fade Slow. |
| 6 | Light 7. |
| 7 | Light 12. |
| 8 | Light 20. |
| 9 | Light 8. |
| 10 | Light 4. |
| 11 | Light 17. |
| 12 | Fade Fast. |

The signals are provided by the reader of the tape, which preferably is in the form of apparatus which provides electrical signals of the type which when fed to the printer will operate the shutter and printer in accordance with the pre-set program. Obviously the tape may be read by an operator and then converted into manual adjustments of the shutter and so forth. It is immaterial to the invention which is done, but obviously the use of the automatic reader is dictated for completely automatic and efficient operation.

For each of the signals tabulated above, and to be produced by the reader when the tape 17 is passed through the same the dial 11 had been set to one position only, and the button 14 depressed causing the holes illustrated to be punched in their proper location to provide information which is binary in nature. Movement of the dial 11 to the positions indicated caused certain contacts to be closed between the punch solenoids and the common lead 46, and these represent the consecutive scenes. The information is tabulated below:

| Scene No. | Dial Position | Contacts Closed | Punches Operated |
| --- | --- | --- | --- |
| 0 | 8 | C-24 | No. 8. |
| 1 | 2 | B-2 | No. 2. |
| 2 | 16 | E-16 | No. 5. |
| 3 | 3 | A-3, B-3 | No. 1, No. 2. |
| 4 | Fade S | A-29, B-29 | No. 6, No. 7. |
| 5 | 7 | A-7, B-7, C-7 | Nos. 1, 2, 3. |
| 6 | 12 | C-12, D-12 | Nos. 3 and 4. |
| 7 | 20 | C-20, E-20 | Nos. 3 and 5. |
| 8 | 8 | D-8 | No. 4. |
| 9 | 4 | C-4 | No. 3. |
| 10 | 17 | A-1, E-1 | Nos. 1 and 5. |
| 11 | Fade F | A-27 | No. 6. |

The punches which are operated are activated by the punch solenoids $P_1$ to $P_8$ with the punch number corresponding to the subscript of the characters $P_1$ to $P_8$. The tape is shown to have a series of small perforations 19 evenly spaced by means of which the tape 17 is driven, space for five transverse holes to the left of the row 19, and space for three holes or perforations on the right. These spaces will be punched by the appropriate punch if same is energized for a given position of the dial.

It will thus be seen that there has been devised a simple apparatus by means of which program intelligence control tape may be readily produced through the use of a perforator utilizing binary codes applied without the need for a key-board, but merely by changing the setting of a single dial. The invention will be appreciated without further discussion, but it is desired to point out that variation is possible without in any way departing from the spirit or scope of the invention or sacrificing its advantages.

What it is desired to claim by Letters patent of the United States is:

1. Apparatus for applying perforations to a tape for controlling a machine, said perforations being applied in accordance with a predetermined code related to the function to be performed by the machine in response to a reading of groups of perforations, comprising a tape perforator mechanism including a plurality of punches each having an electric actuator, and means for moving the tape relative said mechanism spaced amounts from position to position along said tape, said tape adapted to be perforated by any desired combination of punches at each position to form one of said groups of perforations, a multiple-contact, multiple-bank switch having a single control member movable to a plurality of positions, a plurality of connections between certain of said contacts and said electric actuators whereby for each position of said control member, circuits are completed through said multiple-bank switch to a predetermined one or more of said actuators, a source of electric current and switch means for connecting said source across said completed circuits simultaneously.

2. Apparatus as claimed in claim 1 in which said last mentioned switch means is normally open, and said apparatus includes charge accumulating means and means for charging the same, a discharge circuit for said accummulating means including a manually operable switch for completing said discharge circuit when it is desired to cause operation of said perforator mechanism, said switch means including an electromagnetic element in said discharge circuit coupled to close said switch means when energized, said discharge circuit when closed by said manually operable switch serving to energize said electromagnetic element only during discharge of said accumulating means whereby to momentarily close said switch means and connect said actuators to said source.

3. In a perforator apparatus which includes a plurality of punches and electric actuators for the same, a source of electric current for operating said actuators, a multiple-contact, multiple-bank switch having a single control member coupled with a contact wiper in each bank and movable with said wipers to any one of a plurality of positions to complete circuits to a selected one or more of said actuators through said multiple-bank switch to said source, there being a normally open switch in series with all of said circuits and said source, electromagnetic means for closing said normally open switch, and means causing momentary energization of said electromagnetic means.

4. A structure as claimed in claim 3 in which said last means comprises a condenser having a discharge circuit which includes said electromagnetic means, a charging circuit connected to said condenser for applying a charge thereto, and means for manually connecting said discharge circuit to said condenser when it is desired to operate said actuators.

5. Apparatus as claimed in claim 2 in which there is included a tape advance mechanism having an electric actuator and a circuit connecting said actuator to said source, but said last circuit being normally open and adapted to be closed when said manually operable switch is closed thereby advancing the tape from one position to its next position when the perforator mechanism has operated.

6. Apparatus for applying coded information to a flexible tape and including separate punching mechanisms for punching perforations at positions along the tape in various combinations of perforations transverse of the tape, the number of perforations and location at any given position being representative of a particular function to be controlled by said tape, and there being a separate electrical activating device for each punching mechanism, and a source of electrical current adapted to be selectively connected to each of said electrical activating devices, and including means for choosing which of said activating devices will be connected with said source at any position of the tape, comprising, a single manually movable control member, a plurality of banks of contacts, each bank including a plurality of contacts, a bus conductor and a slider adapted to establish electrical connection between said bus conductor and whichever of said contacts said slider engages, the bus conductors being connected to said source, all of said sliders being ganged to engage a similarly located contact of all banks at the same time and all being simultaneously moved by movement of said control member, electrical connections between certain selected ones of said contacts and the respective electrical activating devices, whereby for any position of said control member there will be either no electrical activating device connected to be energized, or one or more connected to be energized whereby the punching mechanisms simultaneously will perforate the tape in accordance with a pre-determined code when the circuit to said source is closed.

7. Apparatus as claimed in claim 6 in which means are provided to close the circuit to said source after said manually movable control member has been positioned as desired.

8. Apparatus as claimed in claim 6 in which means are provided to close the circuit to said source after said manually movable control member has been positioned and means are provided to move the tape to its next position after being perforated.

9. In apparatus of the character described for punching a control tape, a coding device comprising a single movable control member, a plurality of banks of contacts, each bank having a plurality of similarly positioned contacts, a contact-engager for each bank and all contact engagers ganged for simultaneous movement by said control member, each bank having a common conductor, and the contact-engager of each bank serving during its movement to consecutively make circuit between each contact and said common conductor, the similarly positioned contact of each bank thus being connected to its common conductor for each position of the control member, a plurality of punch solenoids, certain ones of the said contacts being connected to the punch solenoids for energization thereof when the contact-engager establishes circuits between said certain ones and their respective common conductors, whereby one or more or none of said punch solenoids may have completed circuits thereto established for any position of said control member, the solenoids being connected to convert the position of said control member into a code punched in said control tape through energization of said solenoids, said solenoids and common conductors adapted to be connected across a source of electrical power.

10. In apparatus of the character described for punching a control tape through the energization of punching solenoids from a source of electrical power there being a single perforator for each solenoid, a device interposed between said source and solenoids and comprising a plurality of banks of a plurality of contacts, each bank having a common conductor and all common conductors being connected together, each bank also having a wiper movable between said contacts of said bank and said common conductor whereby each contact is engaged in a complete cycle of movement of said wiper and consecutively connected to said common conductor, all of the wipers being ganged to move together and each engaging the identically positioned contact of its respective bank at the same time, a single movable member coupled with said wipers, indicia on said movable member cooperating with suitable marking means on said apparatus to indicate the position of said wipers, certain ones of the contacts of the banks being connected to said solenoids in pre-determined manner such that for each position of said movable member there will be a different number and sequence of circuits to said solenoids completed, whereby to enable the tape to be punched in accordance with a code determined by the position and number of solenoids energized.

11. A structure as claimed in claim 10 in which there are no circuits energized for certain spacing positions of said movable member.

12. A structure as claimed in claim 10 in which the number of banks is less than the number of solenoids, and at least one bank has contacts therein connected to more than one solenoid.

13. A structure as claimed in claim 10 in which in addition to said interposed device there is provided a single switch means adapted to be closed to complete the circuit and cause all connected solenoids to be energized simultaneously.

14. Apparatus as claimed in claim 13 in which there is included a condenser discharge circuit having electromagnetic means therein, said single switch means is coupled for operation with said electromagnetic means, and means are provided to charge said circuit, and thereafter to discharge the same whereby momentarily to energize said electromagnetic means.

15. A tape perforator for applying a binary coded series of holes at positions spaced along the tape through the establishment of electrical circuits from a source of power and one or more punch solenoids, there being a plurality of solenoids arranged to punch holes at a given position transverse of the tape, punch means spaced across the tape and including: a single rotary member coupled with a shaft, a plurality of wipers on said shaft, a plurality of banks of contacts one bank for each wiper and a common conductor for each bank, a plurality of contacts in each bank, all contacts of each bank being positioned identically relative to the contacts of the others whereby the wipers will all engage the same positioned contact of each bank for any rotative position of said member, the contacts being selectively connected to certain of said solenoids, whereby to establish selective circuits with said solenoids for each different position of said rotary member between said solenoids and said source so as to drive the punch means and perforate said tape at one position.

16. A device as claimed in claim 15 in which means are provided to advance the tape to its next position after same has been perforated in said one position.

References Cited in the file of this patent
UNITED STATES PATENTS

| | | |
|---|---|---|
| 1,109,565 | Bickley | Sept. 1, 1914 |
| 2,364,207 | Ghertman | Dec. 5, 1944 |
| 2,826,252 | Dickstein | Mar. 11, 1958 |